United States Patent [19]
Kabata et al.

[11] Patent Number: 5,900,336
[45] Date of Patent: May 4, 1999

[54] NEGATIVE ELECTRODE FOR LITHIUM SECONDARY BATTERY AND LITHIUM SECONDARY BATTERY USING THE NEGATIVE ELECTRODE

[75] Inventors: Toshiyuki Kabata; Yoshiko Kurosawa, both of Yokohama; Toshiyuki Ohsawa, Kawasaki; Nobuo Katagiri, Yokohama; Okitoshi Kimura, Yokohama; Toshishige Fujii, Yokohama; Yoshitaka Hayashi, Machida; Hiroyuki Iechi, Yokohama; Yumiko Suzuki; Tomohiro Inoue, both of Sagamihara, all of Japan

[73] Assignee: Ricoh Company, Ltd., Tokyo, Japan

[21] Appl. No.: 08/906,907

[22] Filed: Aug. 6, 1997

Related U.S. Application Data

[63] Continuation of application No. 08/591,351, Jan. 25, 1996, abandoned.

[30] Foreign Application Priority Data

| Jan. 25, 1995 | [JP] | Japan | 7-028767 |
| Jan. 25, 1995 | [JP] | Japan | 7-028768 |
| Feb. 10, 1995 | [JP] | Japan | 7-046234 |
| Feb. 10, 1995 | [JP] | Japan | 7-046235 |
| May 8, 1995 | [JP] | Japan | 7-134801 |
| Oct. 20, 1995 | [JP] | Japan | 7-297499 |

[51] Int. Cl.$^6$ .............................. H01M 10/40; H01M 4/60
[52] U.S. Cl. ........................................................... 429/231.4
[58] Field of Search .................................. 429/218, 231.4

[56] References Cited

U.S. PATENT DOCUMENTS

| 4,978,600 | 12/1990 | Suzuki et al. | 429/218 |
| 5,069,683 | 12/1991 | Fong et al. | 429/218 |
| 5,158,578 | 10/1992 | Yoshimoto et al. | 29/623.5 |
| 5,225,296 | 7/1993 | Ohsawa et al. | 429/218 |
| 5,273,842 | 12/1993 | Yamahira et al. | 429/218 |
| 5,344,726 | 9/1994 | Tanaka et al. | 429/218 |
| 5,348,818 | 9/1994 | Asami et al. | 429/218 |
| 5,401,598 | 3/1995 | Miyabayashi et al. | 429/218 |
| 5,451,477 | 9/1995 | Omaru et al. | 429/218 |
| 5,491,041 | 2/1996 | Abraham et al. | 429/212 |
| 5,554,462 | 9/1996 | Flandrois et al. | 429/218 |

*Primary Examiner*—Maria Nuzzolillo
*Assistant Examiner*—Carol Chaney
*Attorney, Agent, or Firm*—Oblon, Spivak, McClelland, Maier & Neustadt, P.C.

[57] ABSTRACT

A negative electrode for a lithium secondary battery includes at least two kinds of carbon materials with a spacing of lattice plane ($d_{002}$) of 3.4 Å or less in the direction of the C axis thereof. A lithium secondary battery using this negative electrode is provided.

23 Claims, No Drawings

1

NEGATIVE ELECTRODE FOR LITHIUM SECONDARY BATTERY AND LITHIUM SECONDARY BATTERY USING THE NEGATIVE ELECTRODE

This application is a Continuation of application Ser. No. 08/591,351, filed on Jan. 25, 1996, now abandoned.

BACKGROUND OF THE INVENTION

1. Field of the Invention

The present invention relates to a negative electrode for a lithium secondary battery and also relates to a lithium secondary battery comprising the negative electrode.

2. Discussion of Background

Recent development of small, thin, and lightweight electronic appliances in remarkable, particularly in the field of office automation. For instance, lightweight electric appliances have been developed from desk-top type to lap-top typo, and then to note-book type.

In addition, new small size electronic appliances such as electronic notebooks, and electronic still cameras are also placed on the market. Furthermore, memory cards which are now small size memory media are now being developed in addition to the reduction in size of conventional hard disks and floppy disks.

In the midst of the recent trend of making small sized, thin and lightweight the above-mentioned electronic appliances, a secondary battery with higher performance capable of supporting these appliances is demanded.

Under such circumstances, a lithium secondary battery has been rapidly developed as a battery with high energy density, by which conventional lead storage batteries and nickel cadmium storage batteries will be eventually replaced. (A) As an active material for use in a positive electrode (hereinafter referred to as the positive electrode active material) for such a lithium secondary battery, transition metal oxides and transition metal chalcogenides such an $TiS_2$, $MoS_2$, $CoO_2$, $V_2O_5$, $FeS_2$, $NbS_2$, $ZrS_2$, $VSe_2$, and $MnO_2$ are used. Many secondary batteries using such inorganic materials as active materials have been studied.

When such inorganic materials are used as active materials, it is possible to perform reversible, electrochemical intercalation of lithium ions into and deintercalation thereof from the structure of these inorganic materials. By utilizing this property of the above inorganic active materials, the development of lithium secondary batteries has bean made.

Generally, lithium secondary batteries using the above-mentioned inorganic materials as positive electrode active materials can easily constitute secondary batteries having high energy density because those positive active materials themselves have high densities.

Furthermore, in the case where occlusion and releasing of lithium ions are respectively carried out by the intercalation of lithium ions into the crystalline structure of the above positive electrode active material, and by the deintercalation of lithium ions from the crystalline structure of the positive electrode active material, a battery with excellent voltage plateau can be easily fabricated. Such a battery, however, has the shortcoming that when lithium ions are excessively built up in the crystalline structure of the positive electrode active material, the crystalline structure of the positive electrode active material is destroyed and the function thereof is significantly degraded. This means that such inorganic materials are vulnerable to overdischarge when used as positive active materials for the lithium secondary battery.

Recently during the development of lithium secondary batteries using such inorganic materials as positive electrode active materials, conducting polymers have been discovered which can perform an electrode reaction by carrying out reversible occlusion and releasing or doping and undoping of an anion and therefore can be used as positive electrode active materials for a lithium secondary battery.

Such conducting polymers have the advantages over conventionally employed inorganic materials that they are light and exhibit high output power density, excellent electric collection performance due to the electroconductivity thereof, high cycle characteristics for a 100% depth of discharge, and excellent workability for the fabrication of an electrode.

Examples of such conducting polymers so far reported are polyacetylene (refer to, for example, Japanese Laid-Open Patent Application 56-136499), polypyrrole (refer to, for example, the 25th Battery Symposium, Abstracts, P2561.1984), and polyaniline (refer to, for example, the 50th Convention of Electric Science Association, Abstracts, P2281.1984).

For instance, in Japanese Laid-Open Patent Application 63-102162, there is proposed a composite electrode comprising a conducting polymer and an inorganic active material.

Japanese Patent Application 5-129997 discloses a positive composite electrode with high energy density which is fabricated by composing a conducting polymer and an inorganic material under particular conditions, which has excellent workability, voltage plateau, and current characteristics.

(B) Another problem encountered in the course of the development of the lithium secondary battery is the development of a negative electrode. Conventionally, as a negative active material for the negative electrode of a lithium secondary battery, lithium and lithium-aluminum alloys are used.

When lithium is employed as the negative active material for the negative electrode, high electromotive force can be provided, and high energy density can also be provided because of the light weight of lithium. However, lithium has the shortcoming of shortening the cycle life of the battery because of the formation of dendrites thereof which decompose an electrolytic liquid employed in the battery. Further, when the dendrites grow and reach the punitive electrode, internal short-circuits take place in the battery.

When a lithium alloy is employed, the difficulties caused by the above-mentioned problems can be lightened. However, a secondary battery with satisfactory capacity cannot be obtained when a lithium alloy is employed as the negative active material for the negative electrode thereof.

Under such circumstances, it has been proposed to use as negative active materials carbon materials capable of occluding and releasing lithium ions. However, presently announced batteries which employ carbon materials in the negative electrodes thereof are not considered to make best use of the function of a lithium ion battery. It is considered that this is because the energy density and the chargeable and dischargeable current densities at the negative electrode are not high. To be more specific, a carbon material with high crystallinity is theoretically expected to have an energy density of 372 mAh/g. In comparison with such a high energy density as inherently possessed by the carbon material used as a negative active material, the energy density of a worked negative electrode, in particular, the volume energy density thereof, is significantly lower, and the internal impedance of the electrode is so high that the energy density is high at a low current density, but the energy density at the negative electrode is considerably decreased when charging and discharging are performed with a large electric current.

Furthermore, changes in the crystalline structure of the carbon materials, caused in the course of the charging and discharging steps, are so large that the strength of the negative electrode is lowered during the repetition of charging and discharging cycles, resulting in insufficient cycle characteristics.

Furthermore, even if the initial capacity of the negative electrode is large, the negative electrode deteriorates during the repeated charging and discharging cycles, and the capacity thereof rapidly decreases. Due to these problems, the conventional carbon materials are not suitable for making satisfactory use of the function of a secondary battery.

As the above-mentioned carbon materials, carbons with high crystallinity are preferable. In particular, graphite is preferable. However, when graphite is used alone, at present, satisfactory results are not always obtained due to the problems in connection with the matching with an electrolytic liquid, the capacity of the negative electrode, and cycle characteristics of the battery.

SUMMARY OF THE INVENTION

It is therefore a first object of the present invention to provide a negative electrode comprising as a negative active material a carbon material capable of occluding and releasing lithium ion, for use in a lithium secondary battery, which negative electrode is capable of charging and discharging with high energy density and extended cycle life even under heavy load charging and discharging conditions.

A second object of the present invention is to provide a lithium secondary battery comprising the above-mentioned negative electrode.

The first object of the present invention can be achieved by a negative electrode for a lithium secondary battery, which comprises at least two kinds of carbon materials with a spacing of lattice plans ($d_{002}$) of 3.4 Å or less in the direction of the C axis thereof.

In the above negative electrode, one of the carbon materials may have a spacing of lattice plane ($d_{002}$) of less than 3.37 Å in the direction of the C axis thereof, and the other carbon material may have a spacing of lattice plane ($d_{002}$) of 3.37 to 3.4 Å in the direction of the C axis thereof.

Further, in the above negative electrode, at least two kinds of the carbon materials may be in the form of particles with different average particle sizes.

Further, in the above negative electrode, the carbon material with a spacing of lattice plans ($d_{002}$) of loss than 3.37 Å may be in the form of particles with an average particle size of 1 to 40 μm, and the carbon material with a spacing of lattice plane ($d_{002}$) in the range of 3.37 to 3.4 Å may be in the form of particles with an average particle size of 1 to 30 μm.

Further, in the above negative electrode, the carbon materials may be in the form of particles, and the spacing of lattice plane ($d_{002}$) of a group of carbon particles with a maximum average particle size may be smaller than the spacing of lattice plane ($d_{002}$) of a group of carbon particles with a minimum average particle size.

The above negative electrode may further comprise a polyvinyl pyridine based binder for binding the carbon materials for the formation of the negative electrode.

The above negative electrode may further comprises a lithium salt.

The second object of the present invention can be achieved by a lithium secondary battery which comprises:
a positive electrode comprising a positive active material;
an electrolyte layer comprising an electrolyte; and
a carbon-ba8ed negative electrode capable of occluding and releasing lithium, which comprises a negative active material comprising at least two kinds of carbon materials with a spacing of lattice plane ($d_{002}$) of 3.4 Å or less in the direction of the C axis thereof.

In the above lithium secondary battery, one of the carbon materials in the negative active material may have a spacing of lattice plane ($d_{002}$) of less than 3.37 Å in the direction of the C axis thereof, and the other carbon material may have a spacing of lattice plans ($d_{002}$) of 3.37 to 3.4 Å in the direction of the C axis thereof.

Further, in the above lithium secondary battery, at least two kinds of carbon materials in the negative active material may be in the form of particles with different average particle sizes.

Further, in the above lithium secondary battery, the carbon material with a spacing of lattice plane ($d_{002}$) of less than 3.37 Å may be in the form of particles with an average particle size of 1 to 40 μm, and the carbon material with a spacing of lattice plane ($d_{002}$) in the range of 3.37 to 3.4 Å may be in the form of particles with an average particle size of 1 to 30 μm.

Further, in the above lithium secondary battery, the carbon materials in the negative active material may be in the form of particles, and the spacing of lattice plane ($d_{002}$) of a group of carbon particles with a maximum average particle size may be smaller than the spacing of lattice plans ($d_{002}$) of a group of carbon particles with a minimum average particle size.

Further, in the above lithium secondary battery, the negative electrode may further comprise a polyvinyl pyridine based binder for binding the carbon materials for the formation of the negative electrode.

Further, in the above lithium secondary battery, the negative electrode may further comprise a lithium salt.

Further, in the above lithium secondary battery, the positive active material for the positive electrode say be a composite active material which comprises an inorganic active material and a conductive polymeric active material.

Further, in the above lithium secondary battery, the inorganic active material may be vanadium pentoxide and the conductive polymeric active material may be polyaniline.

Further, in the above lithium secondary battery, the positive electrode may be further provided with a positive current collector layer which comprises etched aluminum.

Further, in the above lithium secondary battery, the electrolyte for the electrolyte layer may comprise a sulfonate.

Further, in the above lithium secondary battery, the sulfonate may be at least one sulfonate selected from the group consisting of $LiN(CF_3SO_2)_2$, $LiNCF_3SO_3$ and $LiC(CF_3SO_2)_3$.

Further, in the above lithium secondary battery, the sulfonate may preferably be $LiN(CF_3SO_2)_2$.

Further, in the above lithium secondary battery, the electrolyte for the electrolyte layer may comprise a composite electrolyte comprising $LiN(CF_3SO_2)_2$ and at least one electrolytic salt selected from the group consisting of:

(1) $M(BF_4)_x$,
(2) $(R^1R^2R^3R^4)NBF_4$, and
(3) $LiPF_6$ wherein M is an alkali metal or alkaline earth metal; x is an integer of 1 or 2; and $R^1$, $R^2$, $R^3$ and $R^4$ are each an alkyl group.

Further, in the above lithium secondary battery, the electrolyte for the electrolyte layer may comprise a composite electrolyte comprising $LiN(CF_3SO_2)_2$ and at least one lithium salt selected from the group consisting of LiX, $LiSbX_6$, $LiAlX_4$ and LiSCN, wherein X is a halogen atom.

Further, in the above lithium secondary battery, the electrolyte layer may further comprise a solvent which comprises a cyclic carbonate and a chain carbonate.

Further, in the above lithium secondary battery, the cyclic carbonate may be ethylene carbonate.

Further, in the lithium secondary battery, the cyclic carbonate may be at least one carbonate selected from the group consisting of propylene carbonate and ethylene carbonate; and the chain carbonate may be dimethyl carbonate.

Further, in the above lithium secondary battery, the electrolyte for the electrolyte layer may comprise a solid electrolyte.

Further, in the lithium secondary battery, the solid electrolyte may be a viscoelastic gal polymeric solid electrolyte.

DESCRIPTION OF THE PREFERRED EMBODIMENTS

Examples of a carbon material for a negative electrode of a secondary battery are generally pyrolytic carbon, coke, carbon black, graphite, glassy carbon, active carbon, carbon fibers, sintered organic polymers, and mixtures thereof. Of these, graphite is particularly preferable for use as the material for the negative electrode since graphite has high crystallinity and high function of occluding lithium ion.

As negative active materials, the following can be employed:

(1) Insulating or semi-conductive carbons which can be obtained by sintering any of synthetic polymers such as polymers made from phenol, and polyimide, and natural polymers in a reducing atmosphere at a temperature of 400 to 800° C.;

(2) Electroconductive carbons which can be obtained by Wintering any of coal, pitch, synthetic polymers, and natural polymers in a reducing atmosphere at a temperature of 800 to 1300° C.; and (3) Carbon materials which can be obtained by sintering any of coke, pitch, synthetic polymers, and natural polymers in a reducing atmosphere at a temperature of 2000° C. or more.

Of the above-mentioned carbon materials (1) to (3), the carbon materials (3) are preferable. In the carbon materials (3), carbon materials obtained by sintering mesophase pitch or coke in a reducing atmosphere at a temperature of 2500° C. or more, and natural graphite are most preferable, since they exhibit excellent voltage plateau, and preferable electrode characteristics. The above carbon materials, however, have the shortcoming that the crystalline structure of the carbon materials, is so largely caused in the course of the charging and discharging steps that charging and discharging cannot be properly performed at a large current.

The inventors of the present invention have fabricated negative electrodes by using various carbon materials and investigated the characteristics thereof. As a result, they have discovered that when there is employed a negative electrode comprising at least two kinds of carbon materials with a spacing of lattice plane ($d_{002}$) of 3.4 Å or lose in the direction of the C axis thereof, the electronic conduction between each of the particles of the carbon materials can be smoothly performed, so that the negative electrode has high energy density and extended life cycle.

When carbon materials with a spacing of lattice plane ($d_{002}$) of more than 3.4 Å in the direction of the C axis thereof are employed in the negative electrode, the energy density thereof is lowered.

In particular, when a negative electrode is formed by use of at least two kinds of the carbon materials with a spacing of lattice plane ($d_{002}$) of 3.4 Å or less in the direction of the C axis thereof, which are in the form of particles with different average particle sizes, the carbon particles with smaller particle sizes enter the vacant spaces among the carbon particles with larger particle nixes, so that the density of the negative electrode can be increased. Therefore such carbon particles with different average particle sizes are preferable for use in the present invention.

Further, in the above-mentioned at least two kinds of the carbon materials, it is preferable that one of the carbon materials have a spacing of lattice plane ($d_{002}$) of less than 3.37 Å in the direction of the C axis, and that the other carbon material have a spacing of lattice plane ($d_{002}$) of 3.37 to 3.4 Å in the direction of the C axis thereof.

The carbon material with a spacing of lattice plans ($d_{002}$) of less than 3.37 Å is capable of occluding lithium ions in a large quantity, but has a low electronic conductivity in the direction perpendicular to the crystal face thereof, although the electronic conduction in the direction of the crystal face or crystallographic axis thereof, since most of highly crystallized carbon materials are in plane orientation or in axial orientation. Therefore, the electronic conduction between the carbon particles with a spacing of lattice plane ($d_{002}$) of lose than 3.37 Å is not good.

In the case of the carbon material having a spacing of lattice plane ($d_{002}$) of 3.37 to 3.4 Å in the direction of the C axis thereof, the orientation of the crystals thereof is not developed, or the carbon material is in point orientation, so that the carbon material has sufficient electronic conductivity with lose directional property.

Therefore, the negative electrode of the present invention, which comprises the carbon material having a spacing of lattice plane ($d_{002}$) of less than 3.37 Å in the direction of the C axis, and the carbon material having a spacing of lattice plans ($d_{002}$) of 3.37 Å to 3.4 Å in the direction of the C axis thereof, has excellent current collection characteristics and has high energy density at heavy load charging and discharging.

Of the above-mentioned carbon materials, it is preferable that the average particle size of the carbon particles with a minimum average particle size be 80/100 or less, more preferably in the range of 80/100 to 5/100, of the average particle size of the carbon particles with a maximum average particle size.

It is preferable that the carbon material with a spacing of lattice plane ($d_{002}$) of less than 3.37 Å have an average particle size in the range of 1 to 40 μm more preferably in the range of 2 to 30 μm, most preferably in the range of 2 to 20 μm.

When the average particle size of the carbon material is less than 1 μm, when used in the negative electrode, is apt to move within the battery, so that the internal resistance of the battery is apt to be increased by the occurrence of the short-circuits or the clogging of a separator in the battery. When the average particle size of the carbon material is more than 4 μm, it is difficult to fabricate a negative electrode with uniform quality.

It is preferable that the carbon material having a spacing of lattice plane ($d_{002}$) of 3.37 Å to 3.4 Å in the direction of the C axis thereof have an average particle size in the range of 1 to 30 $\mu$m, more preferably in the range of 1 to 25 $\mu$m, most preferably in the range of 1 to 20 $\mu$m. When the average particle size of the carbon material in less than 1 $\mu$m, when used in the negative electrode, is apt to move within the battery, so that the internal resistance of the battery is apt to be increased by the occurrence of the short-circuits or the clogging of the separator in the battery. When the average particle size of the carbon material exceeds 30 $\mu$m, it is difficult to fabricate a negative electrode with uniform quality, and the current collecting performance of the battery is lowered.

Furthermore, with respect to the carbon particles for use in the negative electrode of the present invention, it is preferable that the spacing of lattice plane ($d_{002}$) of a group of the carbon particles with a maximum average particle size be smaller than the spacing of lattice plane ($d_{002}$) of a group of the carbon particles with a minimum average particle size. More specifically, for the improvement of the energy density and current collecting characteristics of the negative electrode, it is preferable that the carbon particles with a larger spacing of lattice plane ($d_{002}$) enter the spaces between the carbon particles with a smaller spacing of lattice plane ($d_{002}$)

The carbon particles with a smaller spacing of lattice plane ($d_{002}$) have intrinsically higher lithium occlusion performance and are capable of producing electronic conduction with directional property, so that the above-mentioned structural combination of the carbon particles is preferable. It is more preferable that the spacing of lattice plane ($d_{002}$) of the carbon particles with the maximum average particle size be lose than 3.37 Å, and that the spacing of lattice plane ($d_{002}$) of the carbon particles with the minimum average particle size be in the range of 3.37 Å to 3.4 Å.

The negative carbon electrode of the present invention may be fabricated by overlaying a current collector on a layer composed of a carbon material and a binder agent, which is prepared by a wet paper making method or the like, by adhesion or pressure application.

It is preferable that the negative carbon electrode be fabricated by coating a current collector with a coating liquid which is prepared by uniformly dispersing the above-mentioned carbon materials in an appropriate solvent, and drying the thus coated coating liquid, since the thus fabricated electrode is better in view of the close contact of the current collector and the coated layer, and the uniformity of the coated layer.

It is more preferable that the negative electrode of the present invention be fabricated by successively overlaying a plurality of the above-mentioned coated layers on the current collector by repeating the above-mentioned coating method.

As the above-mentioned coating method, for instance, conventional coating methods such as wire bar coating method, blade coating method, and die coating method, may be employed, although the coating method for the present invention is not limited to the above-mentioned methods.

The negative electrode of the present invention may be formed in any shape with any size. It is preferable that the negative electrode of the present invention be formed in the shape of a film.

When the above-mentioned coating liquid for the formation of the negative electrode of the present invention is prepared, for example, the following solvents can be employed for dissolving or dispersing binder agents therein: water; alcohols such as methanol and ethanol; ketones such as acetons, methyl ethyl ketone and methyl isobutyl ketone; aromatic solvents such as toluene and xylene; amides such as dimethylformamide; glycols such as ethylene glycol, methylene glycol, and propylene glycol; ethers such as tetrahydrofuran and dioxane; and N-methylpyrrolidone. These solvents can be used alone or in combination. The solvent for the preparation of the above-mentioned coating liquid are not limited to the above solvents.

For dispersing the carbon materials in any of the above-mentioned solvents for the fabrication of the negative electrode of the present invention, for instance, ball mill, sand mill, roll mill and homogenizer can be employed.

It is preferable that the dispersion of the carbon materials have a viscosity in the range of 400 cP to 2000 cP. When the viscosity of the dispersion is less than 400 cP, the carbon components settle in the dispersion and therefore a uniform coating liquid cannot be obtained; while when the viscosity of the dispersion exceeds 2000 cP, the viscosity of the coating liquid is too great to be used as a coating liquid in practice.

When the negative electrode of the present invention is fabricated by use of a binder agent, the following binder agents can be employed: polyvinyl acetate; polyvinyl chloride, polymethyl methacrylate, acrylate resin, polytetrafluoroethylene, polyethylene, chlorosulfonated polyethylene, polystyrene, polypropylene, polyvinylidene fluoride, polyvinyl fluoride, polyvinyl pyridine, polyvinyl-pyridine-based binder agent, nitrile rubber, polybutadiene, butyl rubber, styrene/butadiene rubber, nitrocellulose, cyanoethylcellulose, polyacrylonitrile, and polychloroprene. These binder agents can be used alone or in combination. Furthermore, by copolymerization of any of the above binder agents, the resistance of the negative electrode to an electrolytic liquid for the battery can be intensified.

Of the above-mentioned binder agents, the polyvinyl-pyridine-based binder agent is preferable to fabricate a negative electrode with extended cycle life since the negative electrode fabricated by use of the binder agent can maintain its strength even if charging and discharging are repeated.

It is preferable that the polyvinyl-pyridine-based binder agent be such a binder agent prepared by introducing an epoxy, urethane or acrylic cross-linking structure into polyvinyl pyridine in order to decrease the solubility of the negative electrode in a non-aqueous electrolytic liquid.

When such a polyvinyl-pyridine-based binder agent is employed, it is preferable that a lithium salt such as LiCl, LiBr, LiBF$_4$, LiClO$_4$, LiPF$_6$, LiNCF$_3$SO$_2$ or LiN (CF$_3$SO$_2$)$_2$ be contained in the negative electrode of the present invention. By use of such a lithium salt in the negative electrode, the flexibility and strength of the negative electrode, and the binding of the negative active material in the negative electrode can be significantly increased.

For obtaining appropriate energy density and current collecting effect by use of the negative electrode of the present invention, it is preferable that the thickness of the negative electrode be in the range of 1 to 1000 $\mu$m, more preferably in the range of 10 to 300 $\mu$m.

It is also preferable that the above fabricated negative electrode be pressed so as to control the density thereof in such a manner as to improve the strength, electroconductivity, and volume energy density of the negative electrode.

The negative electrode of the present invention, which is fabricated by use of the above-mentioned carbon materials, has excellent workability and is flexible, so that it is extremely suitable for fabricating a film-shaped electrode for use in a paper-like battery.

As the positive active material for use in the secondary battery of the present invention, for instance, the following materials can be employed: transition metal oxides such as $TiS_2$, $MoS_2$, $V_2O_5$, $MnO_2$ and $CoO_2$; transition metal chalcogen compounds and composite materials composed of a transition metal chalcogen compound and Li, for example, Li composite oxides such as $LiMnO_2$, $LiMnS_2$, $LiMn_2O_4$, $LiCoO_2$, and $LiNO_2$; linear graphite compounds which are organic thermal polymers; carbon fluoride; graphite; and conducting polymers with an electroconductivity of $10^{-2}$S/cm or more in a doped state.

Specific examples of the conducting polymers are polymers ouch as polyaniline, polypyrrole, polyazulene, polyphenylene, polyacetylene, polyacene, polyphthalocyanine, poly-3-methylthiophene, polypyridine, polydiphenylbenzidine, and derivatives thereof.

It is desirable to employ conducting polymers which exhibit excellent cycle characteristics to 100% discharging, and are more resistant to overcharge than inorganic materials. Furthermore, since such conducting polymers are plastic in terms of molding and workability, unconventional characteristics thereof can be utilized when used as the positive active materials in the present invention.

Although the conducting polymers have the above-mentioned advantages over other materials, a secondary battery provided with a positive electrode comprising a positive active material made of a conducting polymer has the following problems that the density of the active material is so small that the volume energy density thereof is low; a sufficient amount of an electrolyte for carrying out an electrode reaction is required in an electrolytic liquid; the changes in the resistance of the electrolytic liquid are great because the changes in the concentration of the electrolytic liquid, caused in the course of the charging and discharging reactions, are great, so that an extremely large amount of electrolytic liquid is required to carry out smooth charging and discharging reactions.

In view of the above-mentioned problems, the secondary battery provided with a positive electrode comprising a positive active material made of a conducting polymer is not suitable for improvement of the energy density.

Under such circumstances, it is conceivable to use in the positive electrode the previously mentioned inorganic chalcogenide compounds and inorganic oxides as positive active materials having high volume energy density. However, these compounds, when used as positive active materials, have the problems that the diffusion rate of the cations thereof in the positive electrode during the electrode reaction accompanied by the charging and discharging is so small that quick charging and discharging are difficult to perform, and that the reversibility thereof is poor and the cycle life thereof is shortened by overcharge.

Furthermore, such inorganic materials cannot be molded an they are and therefore are usually subjected to pressure molding by use of, for instance, tetrafluoroethylene resin powder as a binder agent. In this case, however, the mechanical strength of the positive electrode is insufficient for use in practice; and when lithium ions are excessively built up in the electrode by overdischarge, the crystalline structure of such an inorganic compound is destroyed. Once such destruction takes place, the secondary battery cannot be used any longer.

In order to avoid the above-mentioned problems of the organic active materials and inorganic active materials, it in conceivable to use organic composite active materials and inorganic composite active materials. When a polymeric active material is used, it is required that such a polymeric active material exhibit high electroconductivity by electrochemical doping, and exhibit an electroconductivity of $10^{-2}$S/cm or more as the material for the positive electrode. Furthermore, it is required that such a polymeric active material exhibit high ionic conductivity in terms of ionic dispersion performance. Such polymeric materials have not only current collecting function because of the high electroconductivity thereof, but also binding function as polymers, and also function as active materials.

Conducting polymers are made electrically insulated in an overdischarge state. In the case of a composite positive electrode composed of a conducting polymer and an inorganic active material, even if the composite positive electrode is in an overdischarge state, such an amount of lithium ions by which the structure of the inorganic active material is destroyed is occluded in the composite positive electrode, so that the composite positive electrode is sufficiently resistant to overdischarge.

The conducting polymers for use in the above-mentioned composite positive electrode have the following properties of (1) having the function of an active material; (2) being insoluble in any electrolytic liquid; (3) being capable of binding polymeric materials; and (4) exhibiting electroconductivity.

Thus, the conducting polymers are capable of serving as a binder agent for fixing inorganic active materials. In this case, such an inorganic active material in covered in its entirety by such a conducting polymer. As a result, the peripheral surface of the inorganic active material becomes electroconductive.

Examples of such a conductive polymer are redox active materials such as polyacetylene, polypyrrole, polythiophene, polyaniline and polydiphenylbenzidine. In particular, nitrogen-containing compounds conspicuously exhibit the above-mentioned effects.

Conducting polymers for use in the positive electrode are required to have not only the electroconductive property, but also high ionic conductivity in the ionic diffusion. Of the above-mentioned conducting polymers, polypyrrole, polyaniline and copolymers of the two are preferable in view of the advantages thereof that the electric capacity per unit weight in relatively large, and relatively stable charging and discharging can be performed in non-aqueous electrolytic liquids in general use. Of the above-mentioned preferable conducting polymers, polyaniline is most preferable.

It is preferable that the inorganic active materials for use in the positive composite electrode have excellent voltage plateau. Specific examples of such inorganic active materials are oxides of transition metals such as V, Co, Mn and Ni; and composite oxides composed of the above-mentioned transition metals and alkali metals.

When the electrode potential which is stable to an electrolytic liquid, voltage plateau and energy density are taken into consideration, crystalline vanadium oxides are preferable. Of crystalline vanadium oxides, vanadium pentoxide is most preferable since the voltage plateau portion of the discharge curve of crystalline vanadium pentoxide is located relatively near the electrode potential at the time of the occlusion and releasing of anions of the above-mentioned conducting polymers.

Examples of the material for the current collector for the previously mentioned negative electrode for use in the present invention are metal sheet, metallic foil, metal net, punching metal, expand metal, made of stainless steel, gold, platinum, nickel, aluminum, molybdenum, titanium or copper; and a net or unwoven fabric made of metal plating fibers, metal-deposited wires, or metal-containing synthetic fibers, comprising any of the above-mentioned metals. Of the above-mentioned materials, copper foil is particularly suitable for the current collector in view of close contact performance and current collecting performance.

As the current collector for the positive electrode, the same current collector as that for the negative electrode can also be employed.

As the material for the current collector for the positive electrode, aluminum is preferable in view of the electroconductivity, chemical and electrochemical stability, cost, workability and lightness in weight thereof.

It is preferable that the surface of the current collector for the positive electrode and/or the negative electrode for use in the present invention be roughened. By roughening the surface of the current collector, the contact area with the active material layer can be increased, and the close contact between the active material layer and the current collector can be improved. Accordingly, the impedance of the battery can be decreased.

Furthermore, in the fabrication of the electrodes by use of a coating liquid, the close contact between the active material and the current collector can be significantly improved by subjecting to the surface of the current collector to roughening treatment.

The surface of the current collector can be roughened by abrasion, blast treatment, or chemical or electrochemical etching. When aluminum is used for the current collector, etched aluminum is preferable, which is obtained by etching aluminum. Such etching is most preferable for aluminum since the surface of aluminum can be effectively roughened in the order of microns without deforming aluminum and decreasing the strength of aluminum.

A lithium secondary battery of the present invention comprises the above-mentioned positive electrode; an electrolyte layer comprising an electrolyte, which may be an electrolytic solution or a solid electrolyte; the above-mentioned carbon-based negative electrode, and optionally a separator.

As the electrolytic solution for the lithium secondary battery of the present invention, a solution of an electrolytic salt dissolved in a non-aqueous solvent can be employed.

Examples of such a non-aqueous solvent for preparation of the electrolytic solution are cyclic carbonate solvents such as propylene carbonate, ethylene carbonate and butylene carbonate; chain carbonate solvents such as dimethyl carbonate, diethyl carbonate, methyl ethyl carbonate and methyl isopropyl carbonate; amide solvents such as N-methylformamide, N-ethylformamide, N,N-dimethylformamide, N-methylacetamide, N,N-dimethylacetamide, N-ethylacetamide and N-methylpyrrolidine; lactone solvents such as γ-butyrolactone, γ-valerolactone, δ-valerolactone and 3-methyl-1,3-oxazolidine-2-one; alcohol solvents such as ethylene glycol, propylene glycol, glycerine, methyl cellosolve, 1,2-butanediol, 1,3-butanediol, 1,4-butanediol, diglycerine, polyoxyalkylene glycol, cyclohexanediol and xylene glycol; ether solvents such as methylal, 1,2-dimethoxyethane, 1,2-diethoxyethane, 1-ethoxy-2-methoxyethane and alkoxy polyalkylene ether; nitrile solvents such as benzonitrile, acetonitrile and 3-methoxy propiodinitrile; phosphoric acid and phosphoric ester solvents such as orthophosphoric acid, metaphosphoric acid, pyrophosphoric acid, polyphosphoric acid, phosphorous acid and trimethylphosphate; 2-imidazolidinones such as 1,3-dimethyl-2-imidazolidinone; pyrrolidones; sulfolane solvents such as sulfolane and tetramethylene sulfolane; furan solvents such as tetrahydrofuran, 2-methyltetrahydrofuran and 2,5-dimethoxytetrahydrofuran; dioxolan; dioxane; and dichloroethane. These solvents can be used alone or in combination.

Of the above solvents, preferable are solvents which are composed of any of chain carbonates such as dimethyl carbonate, diethyl carbonate, methyl ethyl carbonate, and methyl isopropyl carbonate, and any of cyclic carbonates such as ethylene carbonate, propylene carbonate, and battalion carbonate.

As the electrolytic salts for use in the lithium secondary battery of the present invention, electrolytic salts which are soluble in non-aqueous solvents and exhibit high ionic conductivity are employed.

In such electrolytic salts, examples of a cation therefor are alkali metal ions, and examples of an anion therefor are $Cl^-$, $Br^-$, $I^-$, $SCN^-$, $ClO_4^-$, $BF_4^-$, $PF_6^-$, $SbF_6^-$, $CF_3SO_3^-$ and $(CF_3SO_2)_2N^-$. Of such electrolytic salts, sulfonic acid salts are preferable.

Specific examples of sulfonic acid salts are $LiN(CF_3SO_2)_2$, $LiCF_3SO_3$, $LiC(CF_3SO_2)_3$, $C_6F_5SO_3Li$ and $C_8F_{17}SO_3Li$. Of these sulfonic acid salts, $LiN(CF_3SO_2)_2$ and $LiC(CF_3SO_2)_3$ are most preferable.

As the electrolytic salts for use in the lithium secondary battery of the present invention, mixtures of the above-mentioned sulfonic acid salts and electrolytic salts other than the sulfonic acid salts can be employed.

Examples of such other electrolytic salts are $LiPF_6$, $LiSbF_6$, $LiAsF_6$, $LiBF_4$, $LiClO_4$, $LiI$, $LiBr$, $KFP_6$, $KClO_4$, $NaPF_6$, $[(n-Bu)_4N]BF_4$, $[(n-Bu)_4N]ClO_4$, $LiAlCl_4$, $LiBR_4$ wherein R is a phenyl group or an alkyl group, LiTFPB, namely $LiB(Ph(-CF_3)_2-3,5)_4$ wherein Ph is a phenyl group, and $LiAlCl_4$. The other electrolytic salts, however, are not limited to these examples. Of the above-mentioned electrolytic salts, $LiN(CF_3SO_2)_2$ is the particularly most suitable electrolytic salt for use in the lithium secondary battery of the present invention, since this electrolytic salt has high ionic conductivity and excellent heavy load discharging characteristics and low temperature characteristics.

However, $LiN(CF_3SO_2)_2$ is corrosive. In particular, when the current collector for the positive electrode is made of aluminum, the aluminum is conspicuously corroded by $LiN(CF_3SO_2)_2$. $LiN(CF_3SO_2)_2$ exhibits the corrosiveness when an elution current flows through the aluminum with the application of an electric field thereto.

The inventors of the present invention have discovered that the corrosiveness of $LiN(CF_3SO_2)_2$ can be depressed by the addition of another electrolytic salt to $LiN(CF_3SO_2)_2$. It has been discovered that as such an additional electrolytic salt, the electrolytic salts composed of the previously mentioned cations and anions are effective for depressing the corrosiveness of $LiN(CF_3SO_2)_2$.

However, in view of the prevention of the corrosion and the matching of the composite positive electrode and composite negative electrode of the present invention, the use of at least one electrolytic salt selected from the group consisting of:

(1) $M(BF_4)_x$,
(2) $(R^1R^2R^3R^4)NBF_4$, and
(3) $LiPF_6$ wherein M is an alkali metal or alkaline earth metal; x is an integer of 1 or 2; and $R^1$, $R^2$, $R^3$ and $R^4$ are each an alkyl group; or the use of at least one lithium salt selected from the group consisting of LiX, $LiSbX_6$, $LiAlX_4$ and LISCN, wherein X is a halogen atom, is effective.

Specific examples of the tetrafluoroborate salt represented by the above formula (1) are $M(BF_4)_x$ are $Li(BF_4)_x$, $Na(BF_4)_x$, $K(BF_4)_x$, $Ca(BF_4)_x$, and $Mg(BF_4)_x$.

Specific examples of the tetrafluoroborate salt represented by the above formula (2) are $LiBF_4$, $(CH_3)_4NBF_4$, $(CH_3CH_2)_4NBF_4$, $(CH_3CH_2CH_2CH_2)_4NBF_4$ and $(CH_3CH_2CH_2CH_2)_2(CH_3)_2NBF_4$.

The concentration of each of the above-mentioned electrolytic salts in an electrolytic solution differs depending upon the electrode and the electrolytic solution to be employed, but it in preferable that the concentration thereof be in the range of 0.1 to 10 mol/l. This is because when the concentration is less than 0.1 mol/l, it is not easy to obtain a sufficient energy density, while when the concentration is more than 10 mol/l, the preparation of the electrolytic solution is not easy.

As a separator which is optionally employed in the present invention, a separator which exhibits low resistance to ion transfer in an electrolytic solution and excellent solution retaining capability.

Specific examples of such a separator are a glass fiber filter, an unwoven filter made of fibers of a polymer such as polyester, Teflon, Polyflon and polypropylene, and unwoven filters made of combinations of glass fibers and polymer fibers.

In the present invention, a solid electrolyte can also be employed instead of the above-mentioned electrolytic solutions and separators, or in combination therewith.

A solid electrolyte is preferable for use in the present invention since no liquid leakage takes place and the safety thereof is high when the battery is exothermic.

Examples of such a solid electrolyte for use in the present invention are inorganic solid electrolytes and organic solid electrolytes.

Specific examples of inorganic solid electrolytes are metal halogenides such as AgCl, AgBr, AgI and LiI; and ion conductors such as $RbAg_4I_5$ and $RbAg_4I_4CN$.

Specific examples of organic electrolytes are solid solutions composed of a polymer matrix such as polyethylene oxide, polypropylene oxide, polyvinylidene fluoride or polyacrylonitrile, and any of the previously mentioned electrolytic salts, which is dissolved in the polymer matrix; cross-linked solid solutions which are prepared by crosslinking the above-mentioned solid solutions; and polymeric solid electrolytes prepared by grafting an ion-dissociated group of low-molecular polyethylene oxide, polyethyleneimine or crown ether, onto a polymer main chain.

A gelated polymeric solid electrolyte composed of any of the above-mentioned electrolytic solutions and a polymer can also be employed in the present invention.

Such a gelated polymeric solid electrolyte can be prepared by the steps of adding a polymerizable compound to any of the previously mentioned electrolytic solutions and polymerizing the polymerizable compound, thereby solidifying the electrolytic solution. Specifically, as such gelated polymeric solid electrolytes, those described in WO91/14294 can be employed.

To be more specific, for example, an acrylate compound such as methoxy diethylene glycol acrylate, or methoxy diethylene alcohol methacrylate, serving as the above-mentioned polymerizable compound, is polymerized in the presence of an initiator such an benzoyl peroxide, azobisisobutyronitrile, methylbenzoyl formate, benzoinisopropyl ether furfuryl acrylate, or trimethylolpropane acrylate, whereby the electrolytic solution in solidified.

Of the above-mentioned solid electrolytes, the above-mentioned gelated polymeric solid electrolytes are preferable in view of the ionic conductivity and flexibility thereof.

Other features of this invention will become apparent in the course of the following description of exemplary embodiments, which are given for illustration of the invention and are not intended to be limiting thereof.

EXAMPLE 1

50 parts by weight of a carbon material with a spacing of lattice plane ($d_{002}$) of 3.355 Å, having an average particle size of 10 μm, 50 parts by weight of a carbon material with a spacing of lattice plane ($d_{002}$) of 3.380 Å, having an average particle size of 10 μm, and 15 parts by weight of polyvinylidene fluoride were mixed with N-methylpyrrolidone until the mixture became a pasta-like mixture.

The thus prepared paste-like mixture was coated on a 20 μm thick copper foil and dried, whereby an active material layer with a thickness of 60 μm was provided on the copper foil. Thus, a negative electrode No. 1 of the present invention was fabricated.

EXAMPLE 2

50 parts by weight of a carbon material with a spacing of lattice plane ($d_{002}$) of 3.356 Å, having an average particle size of 12 μm, 50 parts by weight of a carbon material with a spacing of lattice plane ($d_{002}$) of 3.375 Å, having an average particle size of 8 μm, and 15 parts by weight of polyvinylidene fluoride were mixed with N-methylpyrrolidone until the mixture became a paste-like mixture.

The thus prepared paste-like mixture was coated on a 20 mm thick copper foil and dried, whereby an active material layer with a thickness of 60 μm was provided on the copper foil. Thus, a negative electrode No. 2 of the present invention was fabricated.

Comparative Example 1

100 parts by weight of a carbon material with a spacing of lattice plane ($d_{002}$) of 3.355 Å, having an average particle size of 10 μm and 15 parts by weight of polyvinylidene fluoride were mixed with N-methylpyrrolidone until the mixture became a paste-like mixture.

The thus prepared paste-like mixture was coated on a 20 μm thick copper foil and dried, whereby an active material layer with a thickness of 60 μm was provided on the copper foil. Thus, a comparative negative electrode No. 1 was fabricated.

Comparative Example 2

100 parts by weight of a carbon material with a spacing of lattice plane ($d_{002}$) of 3.375 Å, having an average particle size of 10 μm and 15 parts by weight of polyvinylidene fluoride were mixed with N-methylpyrrolidone until the mixture became a pasta-like mixture.

The thus prepared paste-like mixture was coated on a 20 μm thick copper foil and dried, whereby an active material layer with a thickness of 60 μm was provided on the copper foil. Thus, a comparative negative electrode No. 2 was fabricated.

Comparative Example 3

50 parts by weight of a carbon material with a spacing of lattice plane ($d_{002}$) of 3.355 Å, having an average particle size of 10 μm, 50 parts by weight of a carbon material with a spacing of lattice plane ($d_{002}$) of 3.43 Å, having an average particle size of 10 μm, and 15 parts by weight of polyvinylidene fluoride were mixed with N-methylpyrrolidone until the mixture became a paste-like mixture.

The thus prepared paste-like mixture was coated on a 20 µm thick copper foil and dried, whereby an active material layer with a thickness of 60 µm was provided on the copper foil. Thus, a comparative negative electrode No. 3 was fabricated.

[Negative Electrode Performance Tests]

The negative electrodes Nos. 1 and 2 in Examples 1 and 2 of the present invention and the comparative negative electrodes Nos. 1 to 3 in Comparative Examples 1 to 3 were subjected to the following negative electrode performance test to investigate the electrode characteristics thereof.

An electrolytic solution prepared by dissolving 1M $LiPF_6$ in a mixed solvent composed of ethylene carbonate and dimethyl carbonate with a volume ratio of 1:1.

By use of the above-prepared electrolytic solution, each of the above negative electrodes was charged up to 0 V with respect to a lithium electrode, and discharging was conducted to 0.8 V with a discharge current of 1 mA/cm$^2$ and with a discharge current of 3 mA/cm$^2$, whereby the energy density of each of the negative electrodes was measured.

The results are shown in the following TABLE 1:

TABLE 1

| Discharge current | 1 mA/cm$^2$ | 3 mA/cm$^2$ |
| --- | --- | --- |
| Ex. 1 | 264 mAh/cm$^3$ | 244 mAh/cm$^3$ |
|  | 230 mAh/g | 212 mAh/g |
| Ex. 2 | 275 mAh/cm$^3$ | 257 mAh/cm$^3$ |
|  | 235 mAh/g | 220 mAh/g |
| Comp. Ex. 1 | 230 mAh/cm$^3$ | 188 mAh/cm$^3$ |
|  | 232 mAh/g | 190 mAh/g |
| Comp. Ex. 2 | 228 mAh/cm$^3$ | 206 mAh/cm$^3$ |
|  | 190 mAh/g | 172 mAh/g |
| Comp. Ex. 3 | 228 mAh/cm$^3$ | 211 mAh/cm$^3$ |
|  | 195 mAh/g | 180 mAh/g |

EXAMPLE 3

55 parts by weight of a carbon material with a spacing of lattice plane ($d_{002}$) of 3.355 Å, having an average particle size of 12 µm, 45 parts by weight of a carbon material with a spacing of lattice plane ($d_{002}$) of 3.38 Å, having an average particle size of 12 µm, and 15 parts by weight of polyvinylidene fluoride were mixed with N-methylpyrrolidone until the mixture became a paste-like mixture.

The thus prepared paste-like mixture was coated on a 20 m thick copper foil and dried, whereby an active material layer with a thickness of 60 µm was provided on the copper foil. Thus, a negative electrode No. 3 of the present invention was fabricated.

EXAMPLE 4

55 parts by weight of a carbon material with a spacing of lattice plane ($d_{002}$) of 3.355 Å, having an average particle size of 12 µm, 45 parts by weight of a carbon material with a spacing of lattice plane ($d_{002}$) of 3.38 Å, having an average particle size of 7 µm, and 15 parts by weight of polyvinylidene fluoride were mixed with N-methylpyrrolidone until the mixture became a paste-like mixture.

The thus prepared paste-like mixture was coated on a 20 µm thick copper foil and dried, whereby an active material layer with a thickness of 60 µm was provided on the copper foil. Thus, a negative electrode No. 4 of the present invention was fabricated.

EXAMPLE 5

55 parts by weight of a carbon material with a spacing of lattice plane ($d_{002}$) of 3.355 Å, having an average particle size of 25 µm, 45 parts by weight of a carbon material with a spacing of lattice plane ($d_{002}$) of 3.38 Å, having an average particle size of 7 µm, and 15 parts by weight of polyvinylidene fluoride were mixed with N-methylpyrrolidone until the mixture became a paste-like mixture.

The thus prepared paste-like mixture was coated on a 20 µm thick copper foil and dried, whereby an active material layer with a thickness of 60 µm was provided on the copper foil. Thus, a negative electrode No. 5 of the present invention was fabricated. The thickness of the active material layer was not uniform.

EXAMPLE 6

55 parts by weight of a carbon material with a spacing of lattice plane ($d_{002}$) of 3.356 Å, having an average particle size of 10 µm. 45 parts by weight of a carbon material with a spacing of lattice plane ($d_{002}$) of 3.39 Å, having an average particle size of 15 µm, and 15 parts by weight of polyvinylidene fluoride were mixed with N-methylpyrrolidone until the mixture became a paste-like mixture.

The thus prepared paste-like mixture was coated on a 20 µm thick copper foil and dried, whereby an active material layer with a thickness of 60 µm was provided on the copper foil. Thus, a negative electrode No. 6 of the present invention was fabricated.

EXAMPLE 7

55 parts by weight of a carbon material with a spacing of lattice plane ($d_{002}$) of 3.357 Å, having an average particle size of 12 µm, 45 parts by weight of a carbon material with a spacing of lattice plane ($d_{002}$) of 3.37 Å, having an average particle size of 8 µm, and 10 parts by weight of a commercially available polyvinyl pyridine based binder (made by Koci Chemical Industry Co., Ltd.) were mixed with N-methylpyrrolidone until the mixture became a paste-like mixture.

The thus prepared paste-like mixture was coated on a 20 m thick copper foil and dried, whereby an active material layer with a thickness of 60 µm was provided on the copper foil. Thus, a negative electrode No. 7 of the present invention was fabricated.

EXAMPLE 8

The procedure for fabricating the negative electrode No. 7 in Example 7 was repeated except that 5 parts by weight of $LiBF_4$ was added to the components for preparing the paste-like mixture in Example 7, whereby a negative electrode No. 8 of the present invention was fabricated.

When the thus fabricated negative electrode No. 8 was bent at right angles, the active material layer was neither detached from nor peeled off the copper foil.

[Negative Electrode Performance Tests]

The negative electrodes Nos. 3 to 8 in Examples 3 to 8 of the present invention were subjected to the following negative electrode performance test to investigate the electrode characteristics thereof.

An electrolytic solution prepared by dissolving 2M $Li(CF_3SO_2)_2$ in a mixed solvent composed of ethylene carbonate and propylene carbonate with a volume ratio of 1:1.

By use of the above-prepared electrolytic solution, each of the above negative electrodes was charged up to 0 V with respect to a lithium electrode, and discharging was conducted to 0.8 V with a discharge current of 1 mA/cm$^2$ and with a discharge current of 3 mA/cm$^2$, whereby the energy density of each of the negative electrodes was measured.

With respect to the negative electrodes No. 4, No. 7 and No. 8, the life cycles thereof were also measured.

The results are shown in the following TABLE 2:

TABLE 2

| Discharge current | 1 mA/cm$^2$ | 2 mA/cm$^2$ | Cycle Life |
|---|---|---|---|
| Ex. 3 | 247 mAh/cm$^3$ | 247 mAh/cm$^3$ | — |
|  | 225 mAh/g | 200 mAh/g |  |
| Ex. 4 | 288 mAh/cm$^3$ | 264 mAh/cm$^3$ | 260 times |
|  | 244 mAh/g | 224 mAh/g |  |
| Ex. 5 | 270 mAh/cm$^3$ | 240 mAh/cm$^3$ | — |
|  | 230 mAh/g | 205 mAh/g |  |
| Ex. 6 | 246 mAh/cm$^3$ | 222 mAh/cm$^3$ | — |
|  | 220 mAh/g | 198 mAh/g |  |
| Ex. 7 | 295 mAh/cm$^3$ | 269 mAh/cm$^3$ | more than 400 times |
|  | 250 mAh/g | 228 mAh/g |  |
| Ex. 8 | 300 mAh/cm$^3$ | 277 mAh/cm$^3$ | more than 600 times |
|  | 255 mAh/g | 235 mAh/g |  |

EXAMPLE 9

A beaker call was fabricated by use of the negative electrode fabricated in Example 8, a composite positive electrode composed of polyaniline and vanadium pentoxide with a parts-by-weight ratio of 3:7, with an initial capacity of 2 mAh, and an electrolytic solution, prepared by dissolving 2M LiN(CF$_3$SO$_2$)$_2$ in a mixed solvent composed of ethylene carbonate and propylene carbonate with a volume ratio of 7:3.

The battery characteristics of the thus fabricated beaker call were investigated with a charging and discharging voltage of 2.5 V to 3.7 V and a charging and discharging current of 4 mA.

The results are shown in TABLE 3.

Comparative Sample 4

The procedure for the fabrication of the beaker call in Example 9 was repeated except that the negative electrode employed in Example 9 was replaced by a lithium negative electrode, whereby a comparative beaker call was fabricated.

The battery characteristics of the thus fabricated comparative beaker call were investigated in the same manner as in Example 9.

The results are shown in the following TABLE 3:

TABLE 3

| Cycles | 10 | 50 | 100 | 200 | 300 |
|---|---|---|---|---|---|
| Ex. 9 | 1.9 mAh | 1.8 mAh | 1.8 mAh | 1.7 mAh | 1.7 mAh |
| Comp. Ex. 4 | 2.0 mAh | 1.8 mAh | 1.1 mAh | 0.0 mAh | — |

EXAMPLE 10

A mixture of 1 part by weight of natural graphite with a spacing of lattice plane (d$_{002}$) of 3.357 Å, having an average particle size of 13 μl and 1 part by weight of a carbon material with a spacing of lattice plane (d$_{002}$) of 3.371 Å, having an average particle size of 5 μm, which was obtained by sintering a mesophase pitch in a reducing atmosphere at 2500° C., was dissolved in N-methylpyrrolidone, together with polyvinylidine fluoride.

The above mixture was dispersed in an inert gas atmosphere in a roll mill, whereby a coating liquid was prepared.

The thus prepared coating liquid was coated on an aluminum collector by a wire bar, and dried in air at 80° C. for 20 minutes, whereby a sheet-shaped negative electrode with a 60 μm thick active layer was obtained.

As a counter electrode, a lithium plate was employed.

The following electrolytic solutions were prepared:

A first electrolytic solution was prepared by dissolving 2 moles of LiCF$_3$SO$_3$ in one liter of a mixed solvent composed of EC (ethylene carbonate) and DMC (dimethyl carbonate) with a parts-by-weight ratio of 7:3, which is hereinafter referred to as 2M LiCF$_3$SO$_3$/7E3DME.

A second electrolytic solution was prepared by dissolving 2 moles of LiBF$_4$ in one liter of a mixed solvent composed of EC (ethylene carbonate) and DMC (dimethyl carbonate) with a parts-by-weight ratio of 7:3, which is hereinafter referred to as 2M LiBF$_4$/7E3DME.

By use of the above fabricated negative electrode, the counter electrode, and the first or second electrolytic solution, a first secondary battery and a second battery were respectively fabricated.

Each of the thus fabricated secondary batteries was subjected to the following charging and discharging tests by using a commercially available charging and discharging test apparatus (Trademark "HJ-201B" made by Hokutodenko Co., Ltd.):

Each secondary battery was charged with a current of 0.7 mA/cm$^2$ until the voltage of the battery reached –0.05 V. The battery was then allowed to stand for 1 hour, without charging or discharging. The battery wan then allowed to be discharged with a current of 0.4 mA/cm$^2$ until the voltage of the battery was reduced to 0.8 V.

This charging and discharging cycle was repeated, and the energy density of each battery at the 5th cycle of the charging and discharging and that at the 40th cycle were measured for the evaluation of the battery characteristics of each battery. The results are shown in the following TABLE 4:

TABLE 4

| Energy density (mAh/g) at discharging at 20° C. | | |
|---|---|---|
|  | 5th cycle | 40th cycle |
| 2MLiCF$_3$SO$_3$/7E3DME | 183.0 | 149.6 |
| 2MLiBF$_4$/7E3DME | 175.7 | 109.6 |

EXAMPLE 11

A sheet-shaped negative electrode with a 60 μm thick active layer was fabricated in the same manner an in Example 10 except that the aluminum collector employed in Example 11 was replaced by a stainless steel collector.

As a counter electrode, a lithium plate was employed in the same manner as in Example 10.

An electrolytic solution was prepared by dissolving 2.0 moles of LiN(CF$_3$SO$_2$)$_2$ in a 1 liter of a mixed solvent of EC (ethylene carbonate), PC (propylene carbonate) and DMC (dimethyl carbonate) with a parts-by-weight ratio of 5:2:3.

By use of the above fabricated negative electrode, the counter electrode, and the electrolytic solution, a secondary battery was fabricated, and was then subjected to the same charging and discharging tests an in Example 10.

The results are shown in the following TABLE 5:

TABLE 5

| Energy density (mAh/g) at discharging at 20° C. | |
|---|---|
| 5th cycle | 40th cycle |
| 213 | 183 |

EXAMPLE 12

A secondary battery was fabricated in the same manner as in Example 11 except that the stainless steel collector for the negative electrode employed in Example 11 was replaced by a copper collector, and was then subjected to the same charging and discharging tests as in Example 10.

The results are shown in the following TABLE 6:

TABLE 6

| Energy density (mAh/g) at discharging at 20° C. | |
|---|---|
| 5th cycle | 40th cycle |
| 250 | 245 |

EXAMPLE 13

N-methylpyrrolidone was added to a mixture of $LiCoO_2$, manufactured graphite and polyvinylidene fluoride with a parts-by-weight ratio of 85:8:7, and the mixture was kneaded, whereby a paste-like mixture was prepared.

The thus prepared paste-like mixture was coated on a 20 $\mu m$ thick stainless steel current collector and dried, whereby an active layer with a thickness of 60 $\mu m$ was formed on the stainless steel current collector. Thus, a positive electrode was fabricated.

A negative electrode was fabricated in the same manner as in Example 1.

A separator made of a fine porous polypropylene film was fabricated.

An electrolytic solution was prepared by mixing 1.4 M $LiN(CF_3SO_2)_2$ with a mixed solvent of ethylene carbonate and diethyl carbonate with a volume ratio of 1:1.

Each of the positive electrode and negative electrode was formed into a disk with a diameter of 1.6 cm. By use of the disk-shaped positive electrode and negative electrode, the separator and the electrolytic solution, a bolt-nut shaped cell was fabricated.

The thus fabricated bolt-nut shaped cell was subjected to charging and discharging tests by repeating the charging and discharging cycle under the conditions that charging was performed at a 2 mA, 4.1 V constant current—constant voltage charging for 3 hours, and discharging was performed at a constant current of 2 mA until the voltage of the cell was decreased to 2.8 V.

The results are shown in Table 7.

EXAMPLE 14

A positive electrode was fabricated in the same manner as in Example 13 except that $LiCoO_2$ employed in Example 13 was replaced by $Li_{0.5}NnO_2$.

The procedure for the fabrication of the bolt-nut shaped cell in Example 13 was repeated except that the positive electrode employed in Example 13 was replaced by the above fabricated positive electrode, whereby a bolt-nut shaped cell was fabricated.

The thus fabricated bolt-nut shaped cell was subjected to charging and discharging tests by repeating the charging and discharging cycle under the conditions that charging was performed at a 2 mA, 3.5 V constant current—constant voltage charging for 3 hours, and discharging was performed at a constant current of 2 mA until the voltage of the cell was decreased to 2 V.

The results are shown in Table 7.

EXAMPLE 15

N-methylpyrrolidone was added to a mixture of $Li_{0.5}MnO_2$, polypyrrole and polyvinylidene fluoride with a parts-by-weight ratio of 85:8:7, and the mixture was kneaded, whereby a paste-like mixture was prepared.

The thus prepared paste-like mixture was coated on a 20 $\mu m$ thick stainless steel current collector and dried, whereby an active layer with a thickness of 60 $\mu m$ was formed on the stainless steel current collector. Thus, a positive electrode was fabricated.

The procedure for the fabrication of the bolt-nut shaped cell in Example 14 was repeated except that the positive electrode employed in Example 14 was replaced by the above fabricated positive electrode, whereby a bolt-nut shaped cell was fabricated.

The thus fabricated bolt-nut shaped cell was subjected to the same charging and discharging tests as in Example 14. The results are shown in Table 7.

EXAMPLE 16

An electrolytic solution was prepared by mixing 0.5 M $LiPF_6$ and 1M $LiN(CF_3SO_2)_2$ with a mixed solvent of ethylene carbonate and dimethyl carbonate with a volume ratio of 6:4.

The procedure for the fabrication of the bolt-nut shaped call in Example 15 was repeated except that the electrolytic solution employed in Example 15 was replaced by the above prepared electrolytic solution, whereby a bolt-nut shaped cell was fabricated.

The thus fabricated bolt-nut shaped cell was subjected to the same charging and discharging tests as in Example 15. The results are shown in Table 7.

EXAMPLE 17

The procedure for the fabrication of the bolt-nut shaped cell in Example 16 was repeated except that the negative electrode employed in Example 16 was replaced by the negative electrode fabricated in Example 2, whereby a bolt-nut shaped cell was fabricated.

The thus fabricated bolt-nut shaped cell was subjected to the same charging and discharging tests as in Example 16. The battery characteristics with the following discharge capacities (mAh) an shown in Table 7 were obtained when the charging and discharging cycle as in the following Table 7 was repeated:

TABLE 7

| Cycles | 10 | 100 | 200 | 300 | 400 |
|---|---|---|---|---|---|
| Ex. 13 | 3.0 mAh | 2.4 mAh | 2.2 mAh | 2.1 mAh | 2.1 mAh |
| Ex. 14 | 3.1 mAh | 2.5 mAh | 2.4 mAh | 2.3 mAh | 2.3 mAh |
| Ex. 15 | 3.0 mAh | 2.7 mAh | 2.6 mAh | 2.6 mAh | 2.5 mAh |
| Ex. 16 | 3.1 mAh | 2.9 mAh | 2.8 mAh | 2.8 mAh | 2.7 mAh |
| Ex. 17 | 3.2 mAh | 3.0 mAh | 2.9 mAh | 2.9 mAh | 2.9 mAh |

EXAMPLE 18

[Fabrication of Negative Electrode A]

60 parts by weight of natural graphite with a spacing of lattice plane ($d_{002}$) of 3.355 Å, having an average particle site of 12 $\mu m$, 30 parts by weight of a pitch coke carbon material with a spacing of lattice plane ($d_{002}$) of 3.375 Å, having an average particle size of 7 $\mu m$, and 10 parts by weight of polyvinylidene fluoride were mixed with N-methylpyrrolidone until the mixture became a paste-like mixture.

The thus prepared paste-like mixture was coated with a thickness of 70 $\mu m$ on a 10 $\mu m$ thick copper foil and dried, whereby an active material layer was provided on the copper foil. Thus, a negative electrode A of the present invention was fabricated.

EXAMPLE 19
[Fabrication of Negative Electrode B]

40 parts by weight of mesophase pitch carbon fibers with a spacing of lattice plane ($d_{002}$) of 3.366 Å, having an average particle size of 25 μm, 50 parts by weight of a pitch coke carbon material with a spacing of lattice plane ($d_{002}$) of 3.375 Å, having an average particle size of 7 μm, and 10 parts by weight of polyvinylidene fluoride were mixed with N-methylpyrrolidone until the mixture became a paste-like mixture.

The thus prepared paste-like mixture was coated with a thickness of 70 μm on a 10 μm thick copper foil and dried, whereby an active material layer was provided on the copper foil. Thus, a negative electrode B of the present invention was fabricated.

EXAMPLE 20
[Fabrication of Negative Electrode C]

50 parts by weight of natural graphite with a spacing of lattice plane ($d_{002}$) of 3.355 Å, having an average particle size of 12 μm. 40 parts by weight of a carbon material prepared by sintering mesophase fine spherical particles, with a spacing of lattice plans ($d_{002}$) of 3.380 Å, having an average particle size of 2 μm, and 10 parts by weight of polyvinylidene fluoride were mixed with N-methylpyrrolidone until the mixture became a paste-like mixture.

The thus prepared paste-like mixture was coated with a thickness of 70 μm on a 10 μm thick copper foil and dried, whereby an active material layer was provided on the copper foil. Thus, a negative electrode C of the present invention was fabricated.

EXAMPLE 21
[Fabrication of Negative Electrode D]

60 parts by weight of natural graphite with a spacing of lattice plane ($d_{002}$) of 3.355 Å, having an average particle size of 12 μm. 30 parts by weight of a fluid coke carbon material with a spacing of lattice plane ($d_{002}$) of 3.377 Å, having an average particle size of 6 μm, and 10 parts by weight of polyvinylidene fluoride were mixed with N-methylpyrrolidon until the mixture became a paste-like mixture.

The thus prepared paste-like mixture was coated with a thickness of 70 μm on a 10 μm thick copper foil and dried, whereby an active material layer was provided on the copper foil. Thus, a negative electrode D of the present invention was fabricated.

EXAMPLE 22
[Fabrication of Negative Electrode E]

The negative electrode D fabricated in Example 21 was roll pressed so as to adjust the thickness of the active material layer to 45 μm, whereby a negative electrode E of the present invention was fabricated.

EXAMPLE 23
[Fabrication of Negative Electrode F]

60 parts by weight of natural graphite with a spacing of lattice plane ($d_{002}$) of 3.355 Å, having an average particle size of 12 Åm, 30 parts by weight of a fluid coke carbon material with a spacing of lattice plane ($d_{002}$) of 3.377 Å, having an average particle size of 6 μm, 10 parts by weight of polyvinylidene fluoride, and 5 parts by weight of $LiBF_4$ were mixed with N-methylpyrrolidone until the mixture became a paste-like mixture.

The thus prepared paste-like mixture was coated with a thickness of 70 μm on a 10 μm thick copper foil and dried, whereby an active material layer was provided on the copper foil. Thus, a negative electrode F of the present invention was fabricated.

EXAMPLE 24
[Fabrication of Negative Electrode G]

The negative electrode F fabricated in Example 23 was roll pressed so as to adjust the thickness of the active material layer to 45 μm, whereby a negative electrode G of the present invention was fabricated.

Comparative Example 5
[Fabrication of Negative Electrode H]

90 parts by weight of natural graphite with a spacing of lattice plane ($d_{002}$) of 3.355 Å, having an average particle size of 12 μm, 10 parts by weight of a polyvinylpyridine binder, and 5 parts by weight of $LiBP_4$ were mixed with N-methylpyrrolidone until the mixture became a paste-like mixture.

The thus prepared paste-like mixture was coated with a thickness of 70 μm on a 10 μm thick copper foil and dried, whereby an active material layer was provided on the copper foil. Thus, a negative electrode was fabricated.

The thus fabricated negative electrode was roll pressed so as to adjust the thickness of the active material layer to 45 μm, whereby a negative electrode H was fabricated.

Thus, a negative electrode H was fabricated.

Comparative Example 6
[Fabrication of Negative Electrode I]

The procedure for fabricating the negative electrode H in Comparative Example 5 was repeated except that the natural graphite employed in Comparative Example 5 was replaced by a pitch coke carbon material with a spacing of lattice plane ($d_{002}$) of 3.45 Å, having an average particle size of 15 μm, whereby a negative electrode I was fabricated.

Reference Example 1
[Fabrication of Positive Electrode A]

A mixture of vanadium pentoxide and polyaniline with a parts-by-weight ratio of 9:1 was dispersed with the addition of N-methylpyrrolidone, whereby a coating liquid for the formation of a positive active material layer was prepared.

The thus prepared coating liquid was coated with a thickness of 100 μm on a 20 μm thick stainless steel current collector, and dried, whereby a positive electrode A was fabricated.

Reference Example 2
[Fabrication of Positive Electrode B]

The procedure for the fabrication of the positive electrode A in Reference Example 1 was repeated except that the stainless steel current collector employed in Reference Example 1 was replaced by an electrochemically etched aluminum foil with a thickness of 25 μm, whereby a positive electrode B was fabricated.

EXAMPLE 25

A disk-shaped negative electrode with a diameter of 2 cm was made by stamping out from the negative electrode A fabricated in Example 18.

A disk-shaped positive electrode with a diameter of 2 cm was also made by stamping Out from the positive electrode A fabricated in Reference Example 1.

A separator made of a fine porous polypropylene film was fabricated.

An electrolytic solution was prepared by mixing 1.5M $LiN(CF_3SO_2)_2$ with a mixed solvent of ethylene carbonate and dimethyl carbonate with a volume ratio of 6:4.

By use of the disk-shaped positive electrode and negative electrode, the separator and the electrolytic solution, a coin shaped battery was fabricated.

The thus fabricated coin shaped cell was subjected to charging and discharging tests by repeating the charging and discharging cycle under the conditions that charging was performed at a 2 mA, 3.7 V constant current—constant voltage charging for 3 hours, and discharging was performed at a constant current of 2 mA until the voltage of the cell was decreased to 2.6 V, whereby the battery characteristics of the coin shaped battery were evaluated. The results are shown in Table 8.

EXAMPLE 26

The procedure for the fabrication of the coin shaped battery in Example 25 was repeated except that the negative electrode A employed in Example 25 was replaced by the negative electrode B fabricated in Example 19, whereby a coin shaped battery was fabricated.

The thus fabricated coin shaped cell was subjected to the same charging and discharging tests as in Example 25, whereby the battery characteristics of the coin shaped battery were evaluated. The results are shown in Table 8.

EXAMPLE 27

An electrolytic solution was prepared by dissolving 1.5M $LiN(CF_3SO_2)_2$ with a mixed solvent of γ-butyl lactone and dimethoxyethane with a volume ratio of 6:4.

The procedure for the fabrication of the coin shaped battery in Example 25 was repeated except that the electrolytic solution employed in Example 25 was replaced by the above prepared electrolytic solution, whereby a coin shaped battery was fabricated.

The thus fabricated coin shaped call was subjected to the same charging and discharging tests as in Example 25, whereby the battery characteristics of the coin shaped battery were evaluated. The results are shown in Table 8.

EXAMPLE 28

An electrolytic solution was prepared by dissolving 1.4M $LiN(CF_3SO_2)_2$ and 0.1M tetrabutylammonium tetrafluoroborate in a mixed solvent of ethylene carbonate and dimethyl carbonate with a volume ratio of 6:4.

The procedure for the fabrication of the coin shaped battery in Example 26 was repeated except that the electrolytic solution employed in Example 26 was replaced by the above prepared electrolytic solution, whereby a coin shaped battery was fabricated.

The thus fabricated coin shaped cell was subjected to the same charging and discharging tests as in Example 26, whereby the battery characteristics of the coin shaped battery were evaluated. The results are shown in Table 8.

TABLE 8

| Cycles | 10 | 100 | 200 | 500 |
|---|---|---|---|---|
| Ex. 25 | 4.8 mAh | 4.4 mAh | 4.2 mAh | 3.9 mAh |
| Ex. 26 | 5.2 mAh | 4.7 mAh | 4.4 mAh | 4.2 mAh |
| Ex. 27 | 4.2 mAh | 3.7 mAh | 3.4 mAh | 3.0 mAh |
| Ex. 28 | 5.2 mAh | 4.8 mAh | 4.5 mAh | 4.4 mAh |

EXAMPLE 29

An electrolytic solution was prepared by dissolving 1.4M $LiN(CF_3SO_2)_2$ and 0.1M $LiSbF_6$ in a mixed solvent of ethylene carbonate and dimethyl carbonate with a volume ratio of 6:4.

The procedure for the fabrication of the coin shaped battery in Example 26 was repeated except that the electrolytic solution employed in Example 26 was replaced by the above prepared electrolytic solution, whereby a coin shaped battery was fabricated.

The thus fabricated coin shaped cell was subjected to the same charging and discharging tests as in Example 26, whereby the battery characteristics of the coin shaped battery were evaluated. The results are shown in Table 9.

EXAMPLE 30

An electrolytic solution was prepared by dissolving 1.3M $LiN(CF_3SO_2)_2$ and 0.2M $LiBF_4$ in a mixed solvent of ethylene carbonate and diethyl carbonate with a volume ratio of 6:4.

The procedure for fabricating the coin shaped battery in Example 26 was repeated except that the electrolytic solution employed in Example 26 was replaced by the above prepared electrolytic solution, whereby a coin shaped battery was fabricated.

The thus fabricated coin shaped cell was subjected to the same charging and discharging tests as in Example 26, whereby the battery characteristics of the coin shaped battery were evaluated. The results are shown in Table 9.

TABLE 9

| Cycles | 10 | 100 | 200 | 500 |
|---|---|---|---|---|
| Ex. 29 | 5.2 mAh | 4.8 mAh | 4.5 mAh | 4.3 mAh |
| Ex. 30 | 5.2 mAh | 4.9 mAh | 4.7 mAh | 4.5 mAh |

EXAMPLE 31

The procedure for fabricating the coin shaped battery in Example 30 was repeated except that the positive electrode employed in Example 30 was replaced by the positive electrode fabricated in Reference Example 2, whereby a coin shaped battery was fabricated.

The thus fabricated coin shaped cell was subjected to the same charging and discharging tests as in Example 26, whereby the battery characteristics of the coin shaped battery were evaluated. The results are shown in Table 10.

EXAMPLE 32

The procedure for fabricating the coin shaped battery in Example 31 was repeated except that the negative electrode employed in Example 31 was replaced by the negative electrode C fabricated in Example 20, whereby a coin shaped battery was fabricated.

The thus fabricated coin shaped cell was subjected to the same charging and discharging tests as in Example 26, whereby the battery characteristics of the coin shaped battery were evaluated. The results are shown in Table 10.

EXAMPLE 33

The procedure for fabricating the coin shaped battery in Example 31 was repeated except that the negative electrode employed in Example 31 was replaced by the negative electrode D fabricated in Example 21, whereby a coin shaped battery was fabricated.

The thus fabricated coin shaped cell was subjected to the same charging and discharging tests as in Example 26, whereby the battery characteristics of the coin shaped battery were evaluated. The results are shown in Table 10.

EXAMPLE 34

The procedure for fabricating the coin shaped battery in Example 31 was repeated except that the negative electrode employed in Example 31 was replaced by the negative electrode F fabricated in Example 23, whereby a coin shaped battery was fabricated.

The thus fabricated coin shaped cell was subjected to the same charging and discharging tests as in Example 26, whereby the battery characteristics of the coin shaped battery were evaluated. The results are shown in Table 10.

TABLE 10

| Cycles | 10 | 100 | 200 | 500 |
| --- | --- | --- | --- | --- |
| Ex. 31 | 5.3 mAh | 5.0 mAh | 4.8 mAh | 4.6 mAh |
| Ex. 32 | 5.3 mAh | 5.0 mAh | 4.9 mAh | 4.5 mAh |
| Ex. 33 | 5.2 mAh | 5.0 mAh | 4.9 mAh | 4.8 mAh |
| Ex. 34 | 5.2 mAh | 5.1 mAh | 5.1 mAh | 5.0 mAh |

EXAMPLE 35

The procedure for fabricating the coin shaped battery in Example 31 was repeated except that the negative electrode employed in Example 31 was replaced by the negative electrode E fabricated in Example 22, whereby a coin shaped battery was fabricated.

The thus fabricated coin shaped cell was subjected to the same charging and discharging tests as in Example 25 except that the discharging current was set at 4 mA, whereby the battery characteristics of the coin shaped battery were evaluated. The results are shown in Table 11.

EXAMPLE 36

The procedure for fabricating the coin shaped battery in Example 35 was repeated except that the negative electrode employed in Example 35 was replaced by the negative electrode G fabricated in Example 24, whereby a coin shaped battery was fabricated.

The thus fabricated coin shaped cell was subjected to the same charging and discharging tests an in Example 35, whereby the battery characteristics of the coin shaped battery were evaluated. The results are shown in Table 11.

Comparative Example 7

The procedure for fabricating the coin shaped battery in Example 35 was repeated except that the negative electrode employed in Example 35 was replaced by the negative electrode H fabricated in Comparative Example 5, whereby a comparative coin shaped battery was fabricated.

The thus fabricated comparative coin shaped cell was subjected to the same charging and discharging tests as in Example 35, whereby the battery characteristics of the coin shaped battery were evaluated. The results are shown in Table 11.

Comparative Example 9

The procedure for fabricating the coin shaped battery in Example 35 was repeated except that the negative electrode employed in Example 35 was replaced by the negative electrode I fabricated in Comparative Example 6, whereby a comparative coin shaped battery was fabricated.

The thus fabricated comparative coin shaped cell was subjected to the same charging and discharging tests as in Example 35, whereby the battery characteristics of the coin shaped battery were evaluated. The results are shown in Table 11.

TABLE 11

| Cycles | 10 | 100 | 200 | 500 |
| --- | --- | --- | --- | --- |
| Ex. 35 | 5.0 mAh | 4.8 mAh | 4.7 mAh | 4.7 mAh |
| Ex. 36 | 5.1 mAh | 5.0 mAh | 5.0 mAh | 4.9 mAh |
| Comp. Ex. 7 | 4.2 mAh | 4.0 mAh | 3.5 mAh | 3.0 mAh |
| Comp. Ex. 8 | 3.9 mAh | 3.7 mAh | 3.3 mAh | 2.5 mAh |

EXAMPLE 37

A rectangular negative electrode with a size of 4 cm×5 cm was made from the negative electrode E fabricated in Example 22.

A rectangular positive electrode with a size of 4 cm×5 cm was also made from the positive electrode A fabricated in Reference Example 1.

A separator made of a fine porous polypropylene film was fabricated.

A gelated polymeric solid electrolyte was prepared by mixing 13.8 g of ethoxydiethylene glycol acrylate, 0.2 g of trimethylolpropane triacrylate, and 0.1 g of benzoine isopropyl ether with 86 g of an electrolytic solution prepared by dissolving 1.5M $LiN(CF_3SO_2)_2$ in a mixed solvent of ethylene carbonate, propylene carbonate and dimethyl carbonate with a volume ratio of 5:1:4, and by irradiating the above mixture with UV light.

By use of the rectangular positive electrode and negative electrode, the separator and the gelated polymeric solid electrolyte, a sheet-shaped battery with an outer cover made of a polyethylene/aluminum/polyethylene terephthalate laminated film was fabricated.

The thus fabricated shoot-shaped battery was subjected to charging and discharging tests by repeating the charging and discharging cycle under the conditions that charging was performed at a 10 mA, 3.7 V constant current—constant voltage charging for 4 hours, and discharging was performed at a constant current of 10 mA until the voltage of the battery was decreased to 2.6 V, whereby the battery characteristics of the sheet-shaped battery were evaluated. The results are shown in Table 12.

EXAMPLE 38

A rectangular negative electrode with a size of 4 cm×5 cm was made from the negative electrode G fabricated in Example 24.

A rectangular positive electrode with a size of 4 cm×5 cm was also made from the positive electrode B fabricated in Reference Example 2.

A separator made of a fine porous polypropylene film was fabricated.

A gelated polymeric solid electrolyte was prepared by mixing 13.8 g of ethoxydiethylene glycol acrylate, 0.2 g of trimethylolpropane triacrylate, and 0.1 g of benzoine isopropyl ether with 86 g of an electrolytic solution prepared by dissolving 1.2M $LiN(CF_3SO_2)_2$ and 0.3M $LiBF_4$ in a mixed solvent of ethylene carbonate, propylene carbonate and dimethyl carbonate with a volume ratio of 5:1:4, and by irradiating the above mixture with UV light.

By use of the rectangular positive electrode and negative electrode, the separator and the gelated polymeric solid electrolyte, a sheet-shaped battery with an outer cover made of a polyethylene/aluminum/polyethylene terephthalate laminated film was fabricated.

The thus fabricated sheet-shaped battery was subjected to the same charging and discharging tests as in Example 37, whereby the battery characteristics of the sheet-shaped battery were evaluated. The results are shown in Table 12.

EXAMPLE 39

The procedure for fabricating the sheet-shaped battery in Example 38 was repeated except that $LiBF_4$ employed in Example 38 was replaced by $LiPF_6$, whereby a sheet-shaped battery was fabricated.

The thus fabricated sheet-shaped battery was subjected to the same charging and discharging tests as in Example 37, whereby the battery characteristics of the sheet-shaped battery were evaluated. The results are shown in the following Table 12:

TABLE 12

| Cycles | 10 | 100 | 200 | 500 |
| --- | --- | --- | --- | --- |
| Ex. 37 | 30.5 mAh | 27.3 mAh | 24.5 mAh | 24.0 mAh |
| Ex. 38 | 30.9 mAh | 28.0 mAh | 25.0 mAh | 24.5 mAh |
| Ex. 39 | 30.5 mAh | 28.5 mAh | 26.9 mAh | 25.7 mAh |

Comparative Example 9

The procedure for fabricating the sheet-shaped battery in Example 38 was repeated except that the negative electrode G employed in Example 38 was replaced by the negative electrode H fabricated in Comparative Example 5, whereby a comparative sheet-shaped battery was fabricated.

The thus fabricated comparative sheet-shaped battery was subjected to the same charging and discharging tests as in Example 38, whereby the battery characteristics of the sheet-shaped battery were evaluated. The results are shown in Table 13.

Comparative Example 10

The procedure for fabricating the sheet-shaped battery in Example 38 wag repeated except that the negative electrode G employed in Example 38 was replaced by the negative electrode I fabricated in Comparative Example 6, whereby a comparative sheet-shaped battery was fabricated.

The thus fabricated comparative sheet-shaped battery was subjected to the same charging and discharging tests as in Example 38, whereby the battery characteristics of the sheet-shaped battery were evaluated. The results are shown in the following Table 13:

TABLE 13

| Cycles | 10 | 100 | 200 | 500 |
| --- | --- | --- | --- | --- |
| Comp. Ex. 9 | 25.3 mAh | 22.0 mAh | 20.1 mAh | 16.0 mAh |
| Comp. Ex. 10 | 23.3 mAh | 20.7 mAh | 19.0 mAh | 17.0 mAh |

EXAMPLE 40

A rectangular negative electrode with a size of 4 cm×5 cm was made from the negative electrode E fabricated in Example 22.

A rectangular positive electrode with a size of 4 cm×5 cm was also made from the positive electrode B fabricated in Reference Example 2.

A solid solution electrolyte was prepared by dissolving 1.2M $LiN(CF_3SO_2)_2$ in a cross-linked polyethylene oxide/polypropylene oxide copolymer.

By use of the rectangular positive electrode and negative electrode, and the solid solution electrolyte, a sheet-shaped battery with an outer cover made of a polyethylene/aluminum/polyethylene terephthalate laminated film was fabricated.

The thus fabricated sheet-shaped battery was subjected to charging and discharging tests by repeating the charging and discharging cycle under the conditions that the charging was conducted with a constant current of 1 mA until the voltage reached 3.7 volts, and the discharging was conducted with a constant current of 1 mA until the voltage reached 2.5 volts. At this moment, the discharge capacity of this battery was 28.1 mAh.

The discharge capacity of this battery was 26.5 mAh when the above charging and discharging cycle was repeated 100 times.

Japanese Patent Application No. 7-028767 filed Jan. 25, 1995, Japanese Patent Application No. 7-028768 filed Jan. 25, 1995, Japanese Patent Application No. 7-046234 filed Feb. 10, 1995, Japanese Patent Application No. 7-046235 filed Feb. 10, 1995, Japanese Patent Application No. 7-134801 filed May 8, 1995, and Japanese Patent Application No. 7-297499 filed Oct. 20, 1995 are hereby incorporated by reference.

What is claimed is:

1. A negative electrode for a lithium secondary battery, which comprises carbon particles with at least two different spacings of the lattice plane ($d_{200}$) in the direction of the C axis thereof being 3.40 Å or less with at least two different average particle sizes.

2. The negative electrode for a lithium secondary battery as claimed in claim 1, wherein one of said spacings of the lattice plane ($d_{200}$) in the direction of the C axis of said carbon particles is less than 3.37 Å, and another of said spacings of the lattice plane ($d_{200}$) in the direction of the C axis of said carbon particles is in the range of 3.37 Å to 3.40 Å.

3. The negative electrode for a lithium secondary battery as claimed in claim 1, wherein the spacing of the lattice plane ($d_{200}$) of said carbon particles with the maximum average particle size is smaller than the spacing of lattice plane ($d_{200}$) of said carbon particles with the minimum average particle size.

4. The negative electrode for a lithium secondary battery as claimed in claim 1, further comprising a polyvinyl pyridine based binder for binding said carbon materials for the formation of said negative electrode.

5. The negative electrode for a lithium secondary battery as claimed in claim 4, further comprising a lithium salt.

6. A lithium secondary battery comprising:
   a positive electrode comprising a positive active material;
   an electrolyte layer comprising an electrolyte; and
   a carbon-based negative electrode capable of occluding and releasing lithium, which comprises a negative active material comprising carbon particles with at least two different spacing of lattice planes ($d_{200}$) in the direction of the C axis thereof in a range of 3.40 Å or less and with at least two different average particle sizes.

7. The lithium secondary battery as claimed in claim 6, wherein one of said spacings of lattice planes ($d_{200}$) in the direction of the C axis thereof is less than 3.37 Å, and another of said spacings of lattice planes ($d_{200}$) in the direction of the C axis of said carbon particles is in the range of 3.37 Å to 3.40 Å.

8. The lithium secondary battery as claimed in claim 6, wherein the spacing of lattice plane ($d_{200}$) of said carbon particles with a maximum average particle size is smaller than the spacing of lattice plane ($d_{200}$) of said carbon particles with a minimum average particle size.

9. The lithium secondary battery an claimed in claim 6, wherein said negative electrode further comprises a polyvinyl pyridine based binder for binding said carbon materials for the formation of said negative electrode.

10. The lithium secondary battery as claimed in claim 9, wherein said negative electrode further comprises a lithium salt.

11. The lithium secondary battery as claimed in claim 6, wherein said positive active material for said positive electrode is a composite active material which comprises an inorganic active material and a conductive polymeric active material.

12. The lithium secondary battery as claimed in claim 11, wherein said inorganic active material is vanadium pentoxide and said conductive polymeric active material is polyaniline.

13. The lithium secondary battery an claimed in claim 6, wherein said positive electrode is further provided with a positive current collector layer which comprises etched aluminum.

14. The lithium secondary battery as claimed in claim 6, wherein said electrolyte for said electrolyte layer comprises a sulfonate.

15. The lithium secondary battery as claimed in claim 14, wherein said sulfonate in at least one sulfonate selected from the group consisting of $LiN(CF_3SO_2)_2$, $LiNCF_3SO_3$ and $LiC(CF_3SO_2)_3$.

16. The lithium secondary battery as claimed in claim 15, wherein said sulfonate is $LiN(CF_3SO_2)_2$.

17. The lithium secondary battery as claimed in claim 6, wherein said electrolyte for said electrolyte layer comprises a composite electrolyte comprising $LiN(CF_3SO_2)_2$ and at least one electrolyte salt selected from the group consisting of:

(1) $M(BF_4)_x$,
(2) $(R^1R^2R^3R^4)NBF_4$, and
(3) $LiPF_6$ wherein M is an alkali metal or alkaline earth metal; x is an integer of 1 or 2; and $R^1$, $R^2$, $R^3$ and $R^4$ are each an alkyl group.

18. The lithium secondary battery as claimed in claim 6, wherein said electrolyte for said electrolyte layer comprises a composite electrolyte comprising $LiN(CF_3SO_2)_2$ and at least one lithium salt selected from the group consisting of LiX, $LiSbX_6$, $LiAlX_4$ and LiSCN, wherein X is a halogen atom.

19. The lithium secondary battery as claimed in claim 6, wherein said electrolyte layer further comprises a solvent which comprises a cyclic carbonate and a chain carbonate.

20. The lithium secondary battery an claimed in claim 19, wherein said cyclic carbonate is ethylene carbonate.

21. The lithium secondary battery as claimed in claim 19, wherein said cyclic carbonate is at least one carbonate selected from the group consisting of propylene carbonate and ethylene carbonate; and said chain carbonate is dimethyl carbonate.

22. The lithium secondary battery as claimed in claim 6, wherein said electrolyte for said electrolyte layer comprises a solid electrolyte.

23. The lithium secondary battery as claimed in claim 22, wherein said solid electrolyte is a viscoelastic gel polymeric solid electrolyte.

* * * * *